United States Patent

Kluge et al.

[11] Patent Number: 6,106,077
[45] Date of Patent: Aug. 22, 2000

[54] WHEEL BOLT

[75] Inventors: Andreas Kluge, Renningen; Martin Müller, Besigheim, both of Germany

[73] Assignee: Dr. Ing. h.c.f. Porsche AG, Weissach, Germany

[21] Appl. No.: 08/916,427

[22] Filed: Aug. 21, 1997

[30] Foreign Application Priority Data

Aug. 19, 1996 [DE] Germany .......................... 296 14 320

[51] Int. Cl.[7] .............................. B60B 1/00; F16B 43/00
[52] U.S. Cl. ...................... 301/35.62; 301/122; 301/500; 411/533
[58] Field of Search ............................ 301/35.62, 122.5; 411/371, 372, 533, 383

[56] References Cited

U.S. PATENT DOCUMENTS

| | | | |
|---|---|---|---|
| 1,868,415 | 7/1932 | Gundersen et al. | 411/371 |
| 1,928,068 | 9/1933 | Michelin | 411/533 |
| 1,940,675 | 12/1933 | Crowther | 411/533 |
| 1,944,595 | 1/1934 | Crowther . | |
| 2,372,653 | 4/1945 | Becket | 411/371 |
| 2,672,069 | 3/1954 | Mitchell | 411/533 |
| 2,761,347 | 9/1956 | McKee, Jr. | 411/371 |
| 3,362,737 | 1/1968 | Cobb | 411/533 |
| 3,386,771 | 6/1968 | Verdier et al. | 301/35.62 |
| 3,560,052 | 2/1971 | Verdier | 411/371 |
| 3,673,911 | 7/1972 | Ramillon | 411/533 |
| 3,777,796 | 12/1973 | Takano | 411/533 |
| 3,805,863 | 4/1974 | Starr . | |
| 4,240,670 | 12/1980 | Zorn et al. | 301/35.62 |
| 4,462,730 | 7/1984 | Knohl | 411/371 |
| 4,627,166 | 12/1986 | McMinn | 30/277 |
| 4,969,788 | 11/1990 | Goiny | 411/533 |
| 5,006,025 | 4/1991 | Duran | 411/183 |
| 5,020,951 | 6/1991 | Smith | 411/533 |
| 5,433,567 | 7/1995 | Ito | 411/150 |
| 5,584,628 | 12/1996 | Bernoni | 301/35.62 |
| 5,620,290 | 4/1997 | Homefeldt et al. | 411/533 |
| 5,967,724 | 10/1999 | Terry | 411/533 |

FOREIGN PATENT DOCUMENTS

| | | |
|---|---|---|
| 97104927 | 3/1993 | European Pat. Off. . |
| 0643232A2 | 3/1995 | European Pat. Off. . |
| 1452053 | 9/1966 | France . |
| 6752836 | 9/1968 | Germany . |
| 2207771 | 8/1973 | Germany . |
| 2362837B2 | 7/1974 | Germany . |
| G8412861 U | 8/1984 | Germany . |
| 3325255A1 | 1/1985 | Germany . |
| 3713166A1 | 11/1988 | Germany . |
| 3736774 | 6/1989 | Germany ............... 301/35.62 |

OTHER PUBLICATIONS

Search Report, Germany, Jan. 9, 1997.

*Primary Examiner*—S. Joseph Morano
*Assistant Examiner*—Long Bai Nguyen
*Attorney, Agent, or Firm*—Evenson, McKeown, Edwards & Lenahan, P.L.L.C.

[57] ABSTRACT

A wheel bolt for a a vehicle wheel has a shaft with a torque applying head and a threaded section. A rotatable supporting ring is disposed between the head and threaded section, which supporting ring has a spherical construction with a contact area for contacting a vehicle wheel. The supporting ring is non-rotatably held on the shaft in a ring groove by way of at least one caulking.

10 Claims, 2 Drawing Sheets

WHEEL BOLT

BACKGROUND AND SUMMARY OF THE INVENTION

This application claims the priority of German application 296 14 320.0 filed in Germany on Aug. 21, 1996, the disclosure of which is expressly incorporated by reference herein.

The invention relates to a wheel bolt having a head for applying the torque and a shaft which has a threaded section on its free end and a rotatable supporting ring between the head and threaded section.

From German Patent Document DE 23 62 837 B2, a bolt connection is known for fastening vehicle wheels on vehicle hubs.

The bolt is provided with a supporting ring which has a truncated-cone-shaped construction and is held on the bolt by means of a retaining ring.

It is an object of the invention to provide a wheel bolt having a supporting ring which, in a simple manner, is held on the wheel bolt so that it cannot be lost and a defined fastening of the vehicle wheel on the vehicle hub is ensured.

According to the invention, this object is achieved by providing an arrangement wherein in a contact area of a vehicle wheel when in an in use position holding a wheel, the supporting ring has a spherical construction and is non-rotatably held on the bolt shaft in a ring groove by way of at least one caulking.

Principal advantages achieved by means of the invention are that, because of its spherical, for example, ball-shaped construction, the supporting ring forms a relatively large supporting surface in the receiving device of the vehicle wheel. Furthermore, by way of caulkings, the support ring is connected with the wheel bolt such that the supporting ring is still rotatable on the shaft and thus little friction is generated between the supporting ring and the bolt head during the fastening of the wheel.

The supporting ring consists of a light-metal alloy and is arranged on a wheel bolt made of steel. When a magnesium wheel is fastened to the vehicle hub, it is therefore advantageous for the supporting ring to consist of an aluminum alloy because, as a result, no contact corrosion can arise between the supporting ring and the magnesium wheel, which would occur in the case of a supporting ring made of steel.

The caulkings on the supporting ring are advantageously arranged in a distributed manner on the circumference of the supporting ring. These caulkings engage in a ring groove of the bolt shaft such that a good rotatability of the supporting ring on the wheel bolt is still ensured.

Other objects, advantages and novel features of the present invention will become apparent from the following detailed description of the invention when considered in conjunction with the accompanying drawings.

DETAILED DESCRIPTION OF THE DRAWINGS

Figure 1:
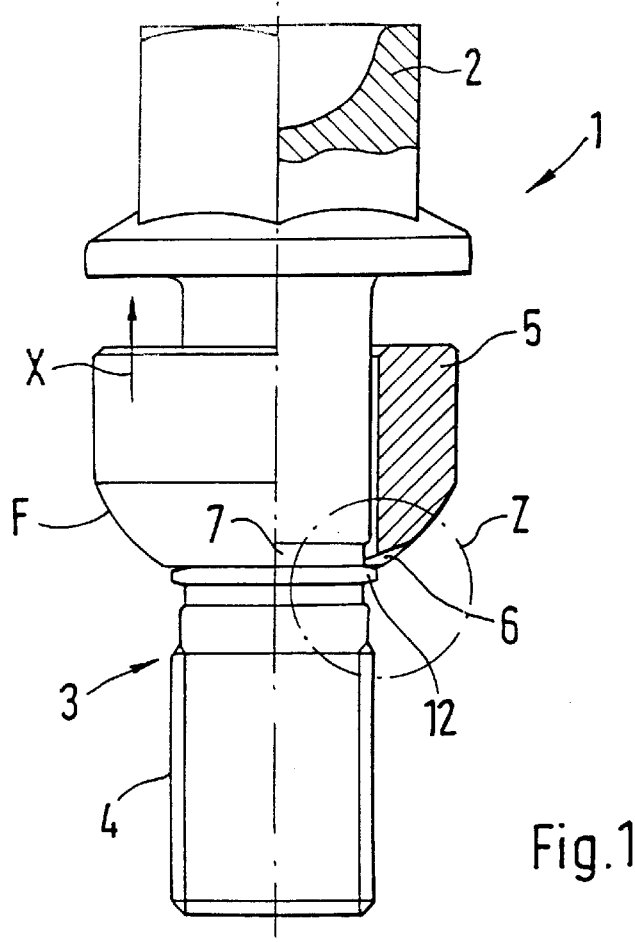
FIG. 1 is an enlarged sectional view of a wheel bolt with a supporting ring, constructed according to a preferred embodiment of the present invention.

A wheel bolt 1 comprises a head 2 and a shaft 3 with a threaded section 4. Between the head 2 and the threaded section 4, a supporting ring 5 is arranged on the shaft 3 of the wheel bolt 1.

Figure 3:
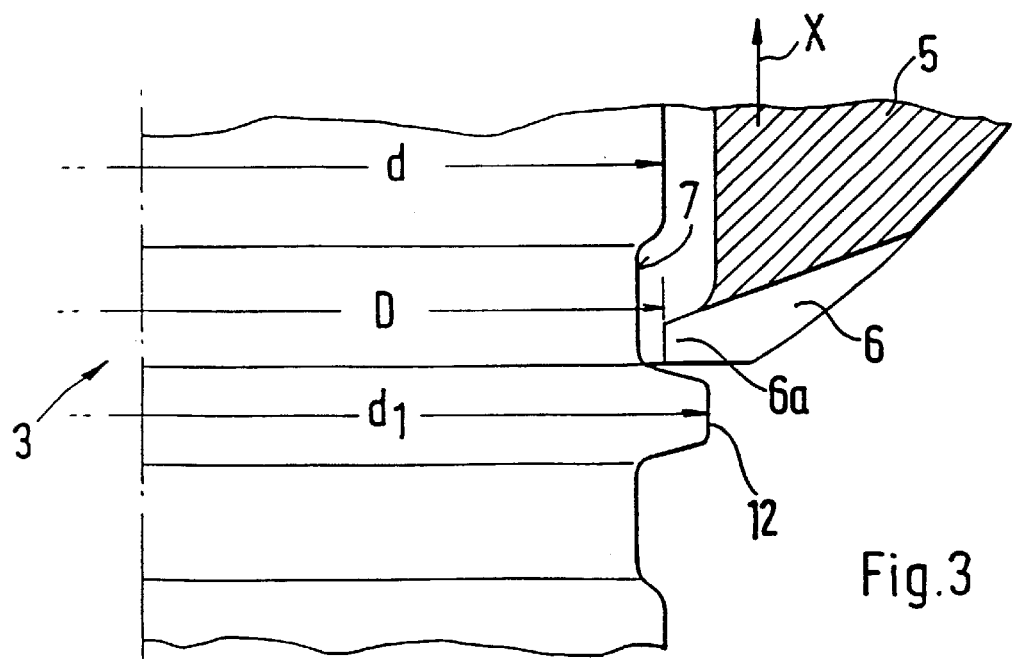
FIG. 3 is an enlarged representation of detail Z from FIG. 1, showing the caulkings on the supporting ring.

The supporting ring is held loosely, that is, rotatably with play, on the shaft 3 and, so that it cannot be lost, is held by way of caulkings 6 of the supporting ring 5 which engage in a ring groove 7 of the shaft 3. Four caulkings 6 are provided preferably in a uniformly distributed manner whose noses 6a engage in the ring groove 7. FIG. 3 is an enlarged view of the caulkings 6.

Figure 2:
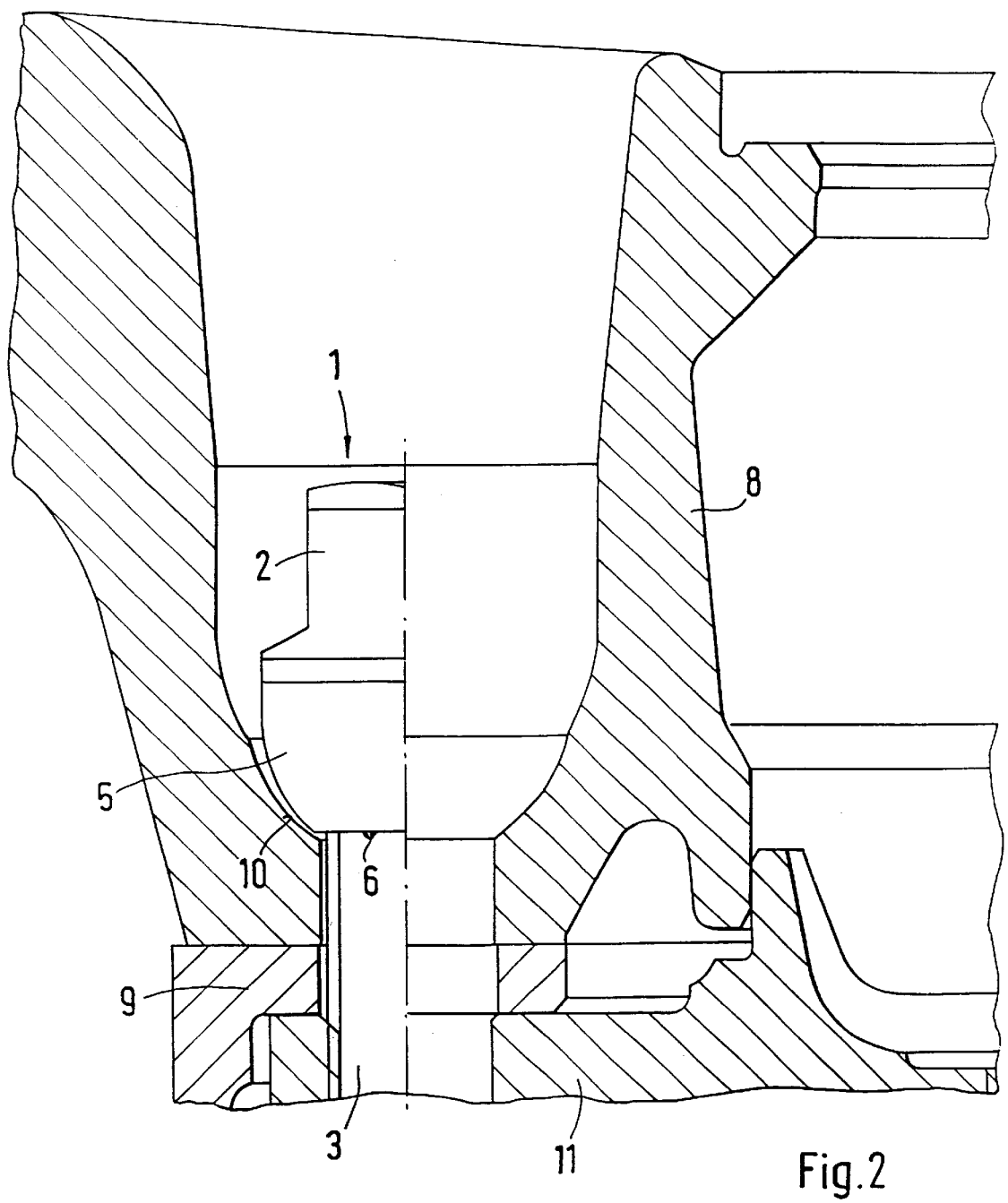
FIG. 2 is a partial schematic view of a vehicle wheel fastened on a vehicle hub by way of the wheel bolt with the supporting ring of FIG. 1.

FIG. 2 shows a portion of a vehicle wheel 8 which is connected by means of a disk chamber 9 by way of the wheel bolt 1 with a vehicle hub 11.

On the exterior side, the supporting ring 5 has a spherical surface F, in which case the caulkings 6 are provided on the lower end of the supporting ring; that is, in the base of the contact area in the receiving device 10 which is also constructed spherically corresponding to the supporting ring 5.

A supporting ring, which is constructed in a truncated-cone shape, can also be fixed by way of caulkings 6 on the wheel bolt 3 in a groove 7.

As illustrated particularly in FIG. 3, the noses 6a of the caulkings 6 on the supporting ring 5 are provided with an inside diameter D which corresponds approximately to the outside diameter d of the shaft 3. As the result, during the fastening, the supporting ring 5 can slide up on the shaft in the direction of the arrow X but cannot fall off the shaft 3. The projection 12 holds the supporting ring 5 in its position so that it cannot be lost.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A wheel bolt for a vehicle wheel, comprising a head for applying torque, a shaft having a ring groove and a threaded section at a free end thereof, and a rotatable supporting ring operatively arranged between the head and the threaded section, wherein the rotatable supporting ring comprises a plurality of caulking noses projecting radially inwardly from an outer periphery of the supporting ring into the ring groove.

2. The wheel bolt according to claim 1, wherein the noses have an inside diameter corresponding approximately to an outside diameter of the shaft.

3. The wheel bolt according to claim 1, wherein the supporting ring consists of an aluminum alloy and is arranged on a wheel bolt consisting of steel.

4. The wheel bolt according to claim 3, wherein the noses of each of the at least one caulking on the supporting ring have an inside diameter which corresponds to an outside diameter of the shaft.

5. Wheel bolt according to claim 2, wherein the ring groove has a projecting surrounding edge whose outside diameter is larger than the inside diameter of the shaft.

6. Wheel bolt according to claim 4, wherein the ring groove has a projecting surrounding edge whose outside diameter is larger than the inside diameter of the shaft.

7. A vehicle wheel bolt assembly comprising:
 a bolt shaft having a ring groove,
 a bolt head fixed to the bolt shaft for accommodating a bolt tightening tool, a threaded section at a free end of the bolt shaft spaced from the bolt head, and a supporting ring rotatably disposed on the shaft between the bolt head and the threaded section, said supporting ring, having a plurality of caulking noses Projecting radially inwards from an outer periphery of the supporting ring to engage in the ring groove.

8. A vehicle wheel bolt assembly according to claim 7, wherein in a contact area of a vehicle wheel when in an in use position holding a wheel, the supporting ring has a spherical construction and is rotatably held on the bolt shaft in a ring groove by way of at least one caulking.

9. A vehicle wheel bolt assembly according to claim 7, wherein noses of respective ones of the at least one the caulking on the supporting ring have an inside diameter which corresponds approximately to an outside diameter of the bolt shaft.

10. A vehicle wheel bolt assembly according to claim 9, wherein the ring groove has a projecting surrounding edge whose outside diameter is larger than the inside diameter of the shaft.

* * * * *